United States Patent [19]

Keller

[11] 4,015,703

[45] Apr. 5, 1977

[54] SHEET MATERIAL TRANSPORT SYSTEM

[75] Inventor: Edwin Keller, Dietlikon, Switzerland

[73] Assignee: Gretag Aktiengesellschaft, Regensdorf, Switzerland

[22] Filed: Sept. 19, 1975

[21] Appl. No.: 615,108

[30] Foreign Application Priority Data

Sept. 24, 1974 Switzerland ..................... 12923/74

[52] U.S. Cl. ................................ 198/624; 271/273

[51] Int. Cl.[2] ........................................ B65G 15/00

[58] Field of Search ................. 198/167, 127 R, 25, 198/624, 780; 271/272, 273, 274

[56] References Cited

UNITED STATES PATENTS

| | | | |
|---|---|---|---|
| 2,822,077 | 2/1958 | Lorig | 198/127 R |
| 3,275,124 | 9/1966 | Lutes et al. | 198/127 R |

FOREIGN PATENTS OR APPLICATIONS

| | | | |
|---|---|---|---|
| 59,770 | 5/1942 | Denmark | 198/167 |
| 699,071 | 10/1953 | United Kingdom | 271/272 |

*Primary Examiner*—Evon C. Blunk
*Assistant Examiner*—Douglas D. Watts
*Attorney, Agent, or Firm*—Pierce, Scheffler & Parker

[57] ABSTRACT

A transport system or conveyor for flexible items comprises at least two successive groups of three rollers. Each group has a larger diameter roller with which two smaller driven rollers provide nips which are angled to another. The entry nip of a following group is angled with respect to the exit nip of the preceding group such that an item is conveyed through successive nips along a wavy or zig-path. At least one of the two smaller rollers of a group is adjustable to set the entry or exit angle. The system is used in apparatus including a treatment station located between two successive roller groups, the treatment itself inducing a bend in the flexible items which is allowed for by the relative angling of the nips. A particular application is to the moving of photographic papers through a drying station in photographic developing machine.

4 Claims, 1 Drawing Figure

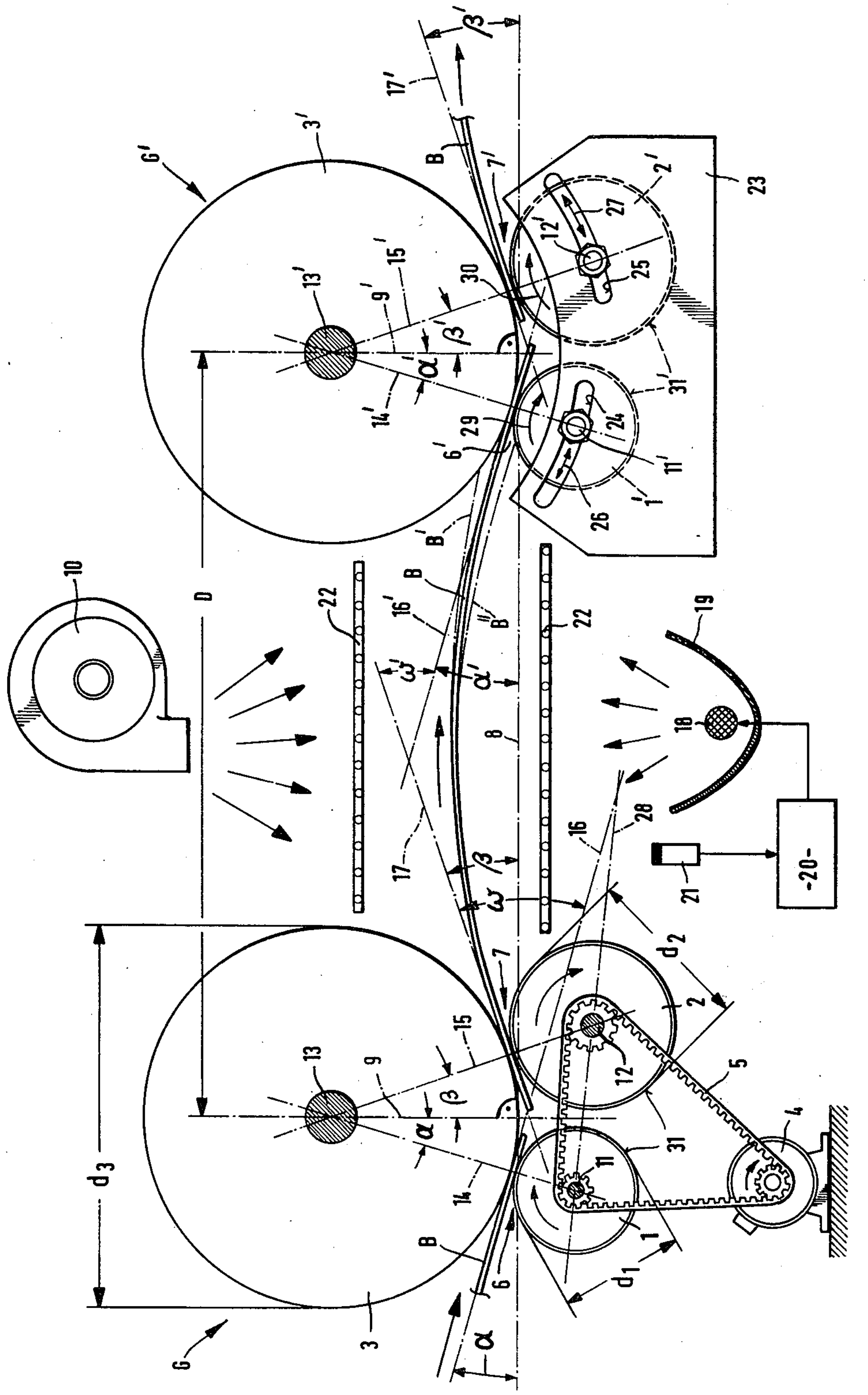
10
-20-
21
22
23
D
$d_1$
$d_2$
$d_3$
B
3
3'
13
13'

SHEET MATERIAL TRANSPORT SYSTEM

FIELD OF THE INVENTION

This invention relates to a transport system for moving items of material in sheet, foil, film or similar flexible form along a path, and to an apparatus for performing some process or treatment upon such items in which such a transport system is employed. A particular, though not exclusive, application of the invention is to the movement of photographic items such as prints in photographic developing machines. The term "conveyor" is also used in relation to transport systems with which the present invention is concerned.

BACKGROUND OF THE INVENTION

It is known to convey discrete items composed of flexible sheet material along a path by passing each item through the nips of successive pairs of rollers, at least one roller of each pair being driven. Transport systems or conveyors of this kind have found use, inter alia, in photographic developing machines where they are used to convey completely developed and cut individual pictures through a drying section of the machine.

Known conveyors for this purpose have two or more roller pairs located along the transport path and separated from one another by a distance corresponding to the length of the items being moved. The relative arrangement of the roller pairs is such that their nips are in alignment — i.e. at the nips all the rollers have a common tangential plane which also defines the transport or conveying path of the items being moved. A roller arrangement of such a kind assumes that the articles to be conveyed advance in a straight line and do not bend out of the plane of the conveying path. The tendency of the material to bend, e.g. due to gravity or to drying air acting on one side of the material or to increased surface tension on one side of the material, is particularly noticeable with very thin items, such as photographic papers or the like, and with these items is virtually unavoidable. In practice, therefore, guide elements in the form of appropriately devised metal members or meshes or the like are disposed between the discrete roller pairs to ensure that the items leaving one nip definitely enter the next nip. However, for various reasons guide elements of this kind are often undesirable and disturbing. Firstly, they impede ready access to the conveyed items when moving between the roller pairs, e.g. in respect of treatment with drying air or radiant heat, and secondly there is a risk, more particularly in the case of photographic papers, of surface damage caused by the guide elements.

SUMMARY OF THE INVENTION

The practice of the present invention described hereafter obviates the disadvantages related above and provides a transport system utilizing rollers for moving items of flexible material without the need for guide elements of the kind described above.

According to the invention there is provided a transport system for moving items of material in sheet, foil, film or similar flexible form comprising:

first and second groups of rollers, each group having three rollers a first and a second of which are spaced apart to cooperate with the third roller at locations spaced around the circumference of the third roller and respectively define therewith an entry nip and an exit nip for moving such flexible items through the group of rollers, the nip planes of the entry and exit nips being inclined at an angle to one another;

at least one roller of each group being arranged to receive drive for rotating the rollers of the group to move such items through the group;

said second group of rollers being spaced from the first group with the entry nip of the second group being disposed adjacent the exit nip of the first group, the nip planes of the entry nip of the second group and the exit nip of the first group being inclined at an angle to one another to define a zig-zag path of movement of such items from the entry nip of the first group of rollers to the exit nip of the second group of rollers; and further comprising an adjustable support means for at least one of said first and second rollers of at least one of said groups, said adjustable support means including a support device to which said at least one roller of said at least one group is journalled, said support device including means adjustable in an arc having a radius essentially equal to the sum of the radii of said first roller and said at least one roller whereby the circumferential location about the third roller of the entry nip or the exit nip, respectively of said at least one group is adjustable.

In the above-recited system a nip plane is the plane at the nip between a pair of rollers which is tangential to both rollers of the pair at the nip (and thus perpendicular to a plane containing the rotational axes of the pair of rollers) and is the plane in which an item is essentially moving at the nip.

It should be understood that additional groups of three rollers having the structure recited above can be added to the system, the relationship between two adjacent groups being as stated above.

A transport system in accord with the invention can be used in apparatus for treating items of material in sheet, foil, film of similar flexible form, which apparatus has a treatment station through which the items are moved. To this end the treatment station is located between the first and second groups of rollers of the transport system so that the items are treated as they move from the first to the second group of rollers.

It will be shown hereafter how a transport system can be devised in accordance with the invention so as to need no kind of guide facility between the successive roller groups. Since, in contrast to the known conveyors, the nip planes at the discrete nips do not lie in a single plane, viz. the plane of the conveying path, but are inclined to the general direction of movement at an acute angle, every item leaves the exit nip of a group at an acute angle to the general direction of movement and enters the entry nip or gap of the next roller group at an acute angle to this general direction. If such entry and exit angles are appropriately chosen — i.e., if the three rollers forming a group are disposed in an appropriate relative arrangement to one another — the deviation caused by the items bending or curving can be compensated so that the items are certain to enter the nip of the next group for engagement by the rollers thereof and onward conveyance.

BRIEF DESCRIPTION OF THE DRAWING

The invention and its practice will now be described in greater detail with reference to an embodiment illustrated in the accompanying drawing, the single FIGURE of which shows two roller groups of a transport system according to the invention as used in the drying section of a photographic developing machine.

DESCRIPTION OF THE PREFERRED EMBODIMENT

For the sake of simplicity a conveyor having only two roller groups G, G' is shown, but the conveyor can of course in practice have any number of such groups. All details unimportant to an understanding of the invention, such as frames and bearings, have been omitted from the drawing for the sake of greater clarity.

The roller group G comprises three parallel, and in this case, horizontally mounted rollers 1, 2, 3. The first roller 1 and the second roller 2 are spaced apart and are driven at the same peripheral speed and in the same direction by a common motor 4 by way of a toothed belt 5 and both cooperate with the third roller 3; in operation, and as shown in the drawing, engagement between the rollers is by way of the sheets or items or the like B which it is required to convey. In the present example, these are developed photographic paper items. The first roller 1 cooperates with the third roller 3 to define an entry nip 6, and the second roller 2 cooperates with the third roller 3 at a circumferential location about the third roller 3 spaced from that at which the first roller 1 coacts with the third roller. The second and third rollers define an exit nip 7 for the group G. The third roller 3 is undriven and rests on the other two rollers 1, 2. Roller 3 is either not mounted to separate supports at all or is mounted for free rotation in such a way as to have some small clearance from the other two rollers so that the items to be moved can pass through readily. Of course, all the rollers are secured against axial displacement.

The roller group G' is of essentially the same construction and orientation as the group G and comprises a first roller 1', a second roller 2' and a third roller 3' arranged in substantially the same way as in the group G; however, in the group G' the relative position of the first roller 1' and second roller 2' to the third roller 3' is adjustable. To this end the bearings in which the two rollers 1', 2' are journalled are mounted for displacement in arcuate slots 24, 25 of two end plates 23 (only one of which can be seen), as indicated by arrows 26, 27. The arc radius of the slot 24 is equal to the sum of the radii of rollers 1' and 3' whereby adjustment along the slot moves the roller 1' about the circumference of the roller 3' thereby also adjusting the angle of inclination of the nip plane 16'. Similarly the slot 25 has an arc radius equal to the sum of the radii of rollers 2' and 3' to obtain a like adjustment of nip plane 17'. The two rollers 1', 2' are driven in the same way as the rollers 1, 2 of group G as indicated by arrows 29, 30, though the drive means is not shown. Of course, the rollers of the group G or, if there are a number of groups, all the groups of rollers can be adjustably mounted, should this feature seem desirable for any reason.

The main direction of movement of the items B is defined by a tangential plane 8 which is one of the two tangential planes common to the third rollers 3 and 3' of any two adjacent groups — in the present case the groups G and G' — and which in the illustrated embodiment is a horizontal plane. Of course, the main direction of conveyance could be at an inclination to the horizontal.

It will be seen that the tangent point of the common plane 8 at the circumference of each third roller 3, 3' lies between the circumferential locations at which the associated first and second rollers 1, 1', and 2, 2' coact with the third roller. The geometry of the roller arrangement with the rollers 1 and 2 (taking group G by way of example) lying on opposite sides of a vertical plane 9 through the tangent point and containing the axis 13 of roller 3 is such that the entry and exit planes of the group G are not only inclined to one another but are oppositely inclined with respect to the plane 8.

The result in the movement of the items B through the rollers is that instead of being moved along an essentially straight path, by virtue of the arrangement of the first and second rollers which define with the third roller nip planes that are alternately inclined ascendingly and descendingly in the direction of movement, the items travel in a wavy or zig-zag path relative to the plane 8.

Looking at the geometry in greater detail, planes 14 and 15 respectively containing the axes 11 and 13 of the first and third rollers and the axes 12 and 13 of the second and third rollers are inclined at respective acute angles $\alpha$ and $\beta$ to the central vertical plane 9. Since each of the respective nip planes 16 and 17 between the rollers 1 and 3 and the rollers 2 and 3 is tangential to both rollers of the cooperating pair at the nip and thus perpendicular to the associated plane 14, 15, the inclinations of the nip planes 16 and 17 to the plane 8 are at the same angles $\alpha$ and $\beta$ respectively by which the planes 14, 15 are inclined to plane 9. Furthermore the entry nip plane 16 is inclined downwardly with respect to plane 8 in the direction of movement of items 8 while the exit nip plane is inclined upwardly in this direction.

Similar considerations apply to the roller group G'. As the drawing shows, the two groups G, G' and, where applicable, other roller groups are so disposed relatively to one another that the successive nip planes 16, 17, 16', 17' etc., in consecutive nips 6, 7, 6', 7' etc., are inclined at an angle $\omega$, $\omega'$ respectively to the nip plane at the immediately preceding nip in a zig-zag pattern alternately to one side and the other.

The items B are carried in a descending path by the nip 6 of roller group G but leave the exit nip 7 of the group G inclined upwards at a lead angle so as to pass between the two groups by way of a gap or space where they are treated in a treatment station located between the roller groups G, G'. In the described embodiment where the items B are photographic prints, the treatment station comprises a blower 10 and an infrared heater 18 associated with a reflector 19. Heating is controlled by an automatic controller 20 cooperating with a temperature sensor 21. The heater 18 applies radiant heat from below to the emulsion side of the items B while the blower 10 supplies a flow of warm drying air downwardly onto the top of the items.

Because of the dynamic pressure of the flow of warm air, the considerable surface tension produced in the emulsion side of the articles by the heating, and self-weight, the items undergo relatively considerable bending or curvature as they pass between the two roller groups; consequently, the items deflect downwardly from their original upwardly inclined path until they enter the inclinedly upwards directed entry nip 6' of the next group G' downwardly and at an acute angle to the horizontal. The deflection of the items caused by the bending is therefore compensated for by the lead or relief angle $\beta$ imparted by the described roller arrangement. If the angle $\beta$ is adjusted appropriately, the items arrive satisfactorily in the nip of the next group of rollers without any guiding assistance. Guard meshes 22 are shown in the drawing. They provide no guidance but merely ensure that in the event of disturbances out of normal movement the articles cannot contact the heater.

The amount of curvature of the items depends of course upon the nature of the material of which they are made and upon external factors which they experience during conveyance between two consecutive roller groups. Of course, the relative arrangement of the rollers must be adapted to the particular curvature tendencies of the particular articles being conveyed. The entry and exit angles $\alpha$, $\beta$ respectively need not of course be the same for all the roller groups. For instance, when there are a number of consecutive rollers groups and the items are acted on by different factors between the various groups, as often occurs in the drying of photographic materials, the curvature tendency of the articles varies from group to group so that the angles $\alpha$, $\beta$ need to be different in each group. However, provided that the diameters of the discrete rollers are not too small, the adjustment of the two angles $\alpha$, $\beta$ is not very critical. If the exit angle $\beta$ of group G has been set too high, the items B move approximately along the path marked B′ and the lead edge of an item is deflected by the third roller 3′ of the group G′ into the entry nip 6′ between roller 3′ and the first roller 1′ of that particular group. Conversely, if the exit angle $\beta$ is too small, the items move approximately along the path B″ and the lead edges are deflected into the nip 6′ by the first roller 1′.

Nor is the entry angle $\alpha$ very critical either; the only requirement is that it should be such that in the entry nip 6 the nip plane 16 intersects the plane 28 containing the axes 11, 12 of the first roller 1 and second roller 2 respectively outside that part of the plane which is disposed between the two axes. That is the nip plane should not pass between the axes of rollers 1 and 2. The intersection of planes 16 and 28 is shown at I. This feature ensures that the articles B arriving by way of the entry nip 6 are always directed towards the exit nip 7 by the second roller 2. Of course, this condition for the entry angle $\alpha$ depends upon the diameters of the individual rollers. Optimum results have been achieved when the third roller of each group has a relatively large diameter compared with those of the other two rollers and the second roller in the direction of movement has a larger diameter than that of the first roller. In an example tested in practice, the first roller 1 had a diameter $d_1$ of 10 mm, the second roller 2 had a diameter $d_2$ of 12 mm and the third roller 3 had a diameter $d_3$ of 30 mm. The entry angle $\alpha$ was 16° and the exit angle $\beta$ was 20°. The total deflection between entry and exit was therefore 36°. The distance between two consecutive roller groups as defined by the between-axis distance D of the third rollers of each group was 60 mm, so that individual articles of down to a minimum length of 76 mm could be conveyed. The rollers 1, 2 in contact with the emulsion side of the articles were coated with a layer 3′ of a material, polytetrafluorethylene, which does not stick to emulsion.

What is claimed is:

1. A transport system for moving items of material in sheet, foil, film or similar flexible form comprising:

first and second groups of rollers, each group having three rollers a first and a second of which are spaced apart to cooperate with the third roller at locations spaced around the circumference of the third roller and respectively define therewith an entry nip and an exit nip for moving such flexible items through the group of rollers, the nip planes of the entry and exit nips being inclined at an angle to one another;

at least one roller of each group being arranged to receive drive for rotating the rollers of the group to move such items through the group;

said second group of rollers being spaced from the first group with the entry nip of the second group being disposed adjacent the exit nip of the first group, the nip planes of the entry nip of the second group and the exit nip of the first group being inclined at an angle to one another to define a zig-zag path of movement for such items from the entry nip of the first group of rollers to the exit nip of the second group of rollers;

and further comprising an adjustable support means for at least one of said first and second rollers of at least one of said groups, said adjustable support means including a support device to which said at least one roller of said at least one group is journalled, said support device including means adjustable in an arc having a radius essentially equal to the sum of the radii of said first roller and said at least one roller whereby the circumferential location about the third roller of the entry nip or the exit nip, respectively, of said at least one group is adjustable.

2. A transport system as claimed in claim 1 wherein said third rollers of said first and second groups are disposed to have a notional common plane tangential to the circumference of each third roller, said notional common plane being tangent to each third roller at a location that lies between said spaced apart circumferential locations at which said first and second rollers of the same group cooperate therewith;

that third roller of each group having a diameter greater than that of each of said first and second rollers, the entry nip plane not passing between the respective axes of rotation of said first and second rollers;

said second roller of each group having a diameter greater than that of said first roller;

and comprising means for supporting said first and second rollers of each group for rotation about respective fixed horizontal axes, said third roller of each group resting on its associated first and second rollers to be freely rotatable thereon, and the nipplanes of the entry and exit nips of each roller group being at an acute angle to a horizontal plane.

3. A transport system according to claim 1 wherein said first and second groups of rollers are located at opposite sides of a treatment station for the material to be transported, said treatment station comprising at least one source of radiant heat and at least one source of heated air flow.

4. A transport system as claimed in claim 2 comprising a respective drive mechanism coupled to apply rotational drive in the same direction to the first and second rollers of each group.

* * * * *